Nov. 23, 1954   E. MEIERJOHAN   2,695,190
ARTICLE TRANSFERRING APPARATUS
Filed April 30, 1952   2 Sheets-Sheet 2
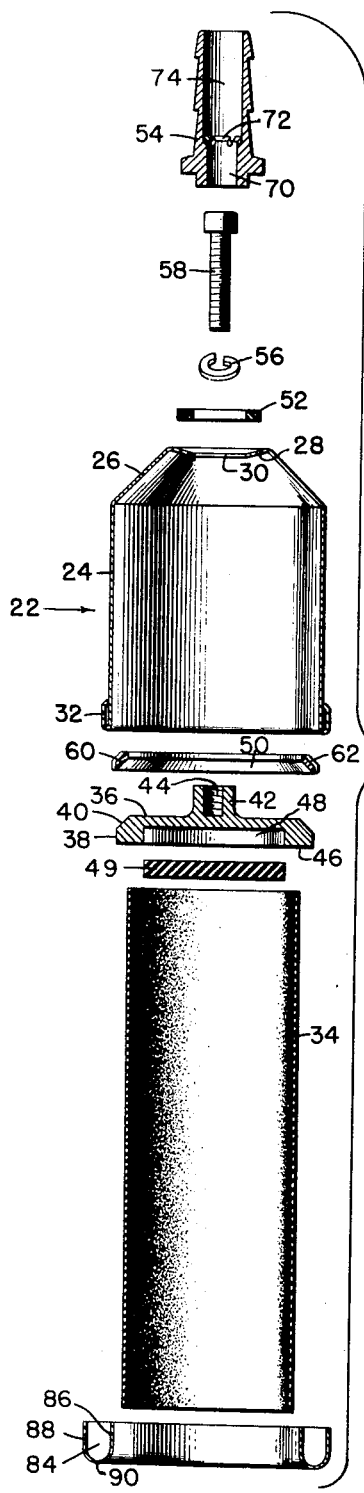
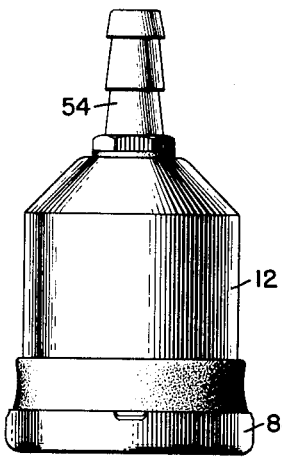
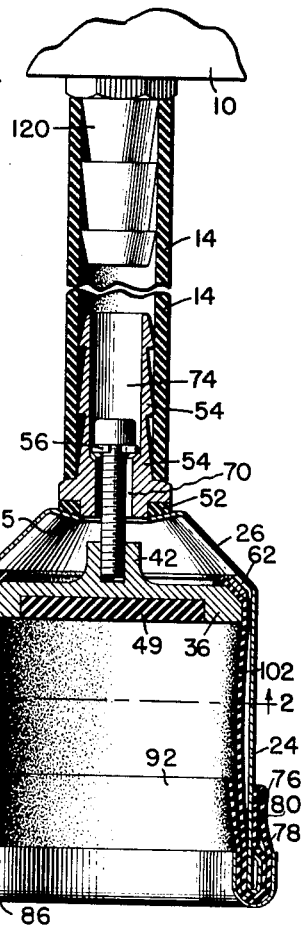
INVENTOR.
ERNEST MEIERJOHAN
BY
ATTORNEY

United States Patent Office 2,695,190
Patented Nov. 23, 1954

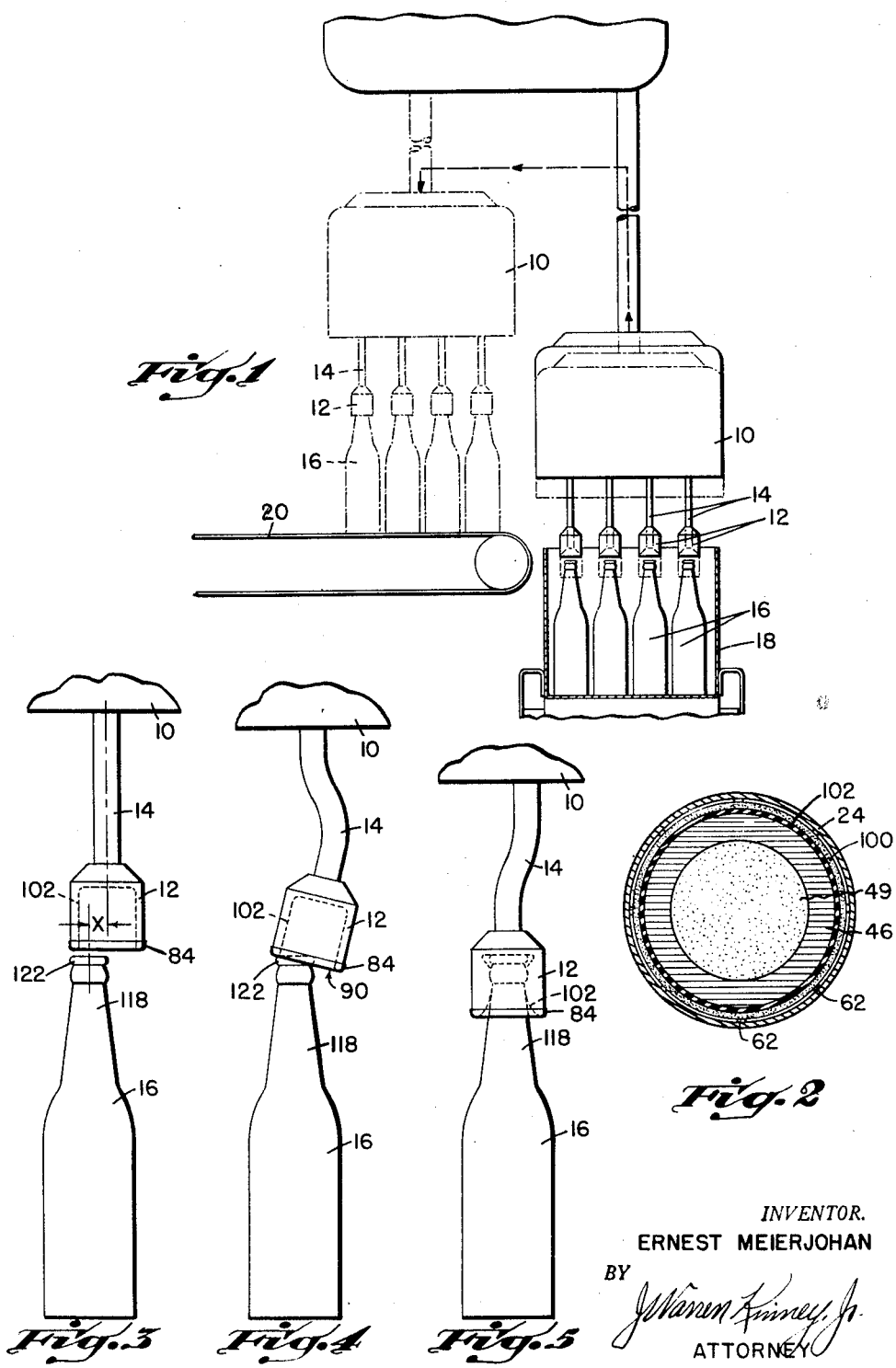

2,695,190

ARTICLE TRANSFERRING APPARATUS

Ernest Meierjohan, Cincinnati, Ohio, assignor, by mesne assignments, to Yundt-Bottlematic Corp., Cincinnati, Ohio, a corporation of Ohio Application April 30, 1952, Serial No. 285,237

13 Claims. (Cl. 294—90)

This invention relates to article transferring apparatus, and particularly to an improvement in the means for engaging the article to be transferred.

An object of the invention is to provide an article transferring apparatus which includes pressure-actuated article-engaging members which are loosely suspended from a support frame whereby each member is independently and freely movable relative to each other and the frame for enabling each member to independently and automatically align itself with articles to be transferred, thereby greatly enhancing the efficiency and utility of the device.

Another object of the invention is to provide a highly efficient, simply constructed, foolproof article-engaging member.

A further object of the invention is to provide an article-engaging member which is particularly adapted for use with cylindrical objects, such as, by way of example, bottles, cans, and the like.

Still a further object of the invention is to provide a cup-shaped article-engaging member of the type which includes a flexible inner wall distendable, under pressure fluid, to engage an article received therein, said member including a flexible flap-like portion for protecting the distendable wall from damage by an article received therein. This flap-like portion effectively prevents cutting of the distendable wall in those instances when the jagged edge of a broken bottle is introduced into the article-engaging member.

Another object of the invention is to provide a pressure-actuated article-engaging member having the hereinabove described characteristics having a combination shield and guide element circumscribing its free, lower, article-receptive edge.

These and other objects are attained by the means described herein and as disclosed in the accompanying drawings, in which:

Fig. 1 is a diagrammatic end view of an article transferring apparatus, embodying the teachings of the present invention.

Fig. 2 is a sectional view of an article engaging member taken on line 2—2 of Fig. 8.

Figs. 3, 4 and 5 are successive views illustrating the manner in which the flexible suspension of an article-engaging member enables it to automatically compensate for axial misalignment of an article to be engaged thereby.

Fig. 6 is a side elevational view of an article-engaging member comprising a detail of the invention.

Fig. 7 is an exploded sectional view of the component parts of the member of Fig. 6.

Fig. 8 is a sectional view of the member of Fig. 6 suspended from a movable support frame.

With particular reference to Fig. 1, the numeral 10 denotes generally a movable frame from which a plurality of pressure-actuated article-engaging members 12 are loosely suspended by means of flexible hose elements 14. Solely by way of example, the articles to be engaged have been illustrated as bottles 16 which are to be removed from container 18 and placed upon conveyor 20.

The present invention is neither directed to nor concerned with the particular means utilized to transfer frame 10 from the loading to the unloading positions illustrated in Fig. 1.

As best illustrated in Fig. 7, the article-engaging member comprises a rigid cup-shaped housing 22 having substantially cylindrical and upwardly inclined side walls 24 and 26, respectively, which terminate in top wall 28 having an aperture 30 therethrough. The lower edge of the side walls may be provided with an annular bead 32.

The upper end of a length of flexible, elastic tubing 34 may be sealed to the upper portion of the inner face of the cup by means of a clamp plate 36, ring 50, packing ring 52, rigid conduit 54, split washer 56 and bolt 58. The clamp plate may include cylindrical and tapered side walls 38 and 40, a boss 42 internally threaded as at 44 and a lower wall 46 having an annular recess 48 provided therein to receive a resilient disc 49.

The upper edge of tubing 34 is pulled upwardly onto the clamp plate to engage side walls 38 and 40, after which ring 50 is placed thereon so that its tapered walls 60 will overlappingly engage those portions of the tubing engaging inclined wall 40 of plate 36.

Ring 50 is provided with a plurality of port forming slots 62 which cooperate with the inner face of tapered wall 26 of the cup housing, note Figs. 2 and 8, for defining fluid passageways between wall 26 and walls 60 of the ring.

The clamp plate, ring and upper end of the tube are securely though releasably fastened to the cup by means of bolt 50 the threaded shank of which extends through split washer 56, bore 70 of conduit 54, packing ring 52, aperture 30 of the cup to engage threaded portion 44 of boss 42.

The split washer 56 rests upon slotted shoulder 72 at the juncture of bores 70 and 74 of the conduit, it being noted that a fluid passageway is thus provided between bore 74 and the zone 75 between the upper portion of housing 22 and clamp plate 36.

The lower end of tube 34 is folded upwardly around the free lower end of the cup-shaped housing and thence downwardly to provide a double thickness 76 and 78 of tubing around the outer wall of the lower portion of the housing. The tube is then folded inwardly under bead 32 and thence upwardly into the interior of the cup for providing a double thickness of tubing around the lower edge and interior of the housing on opposite sides of side wall 24.

If desired, retaining means denoted generally by the numeral 80 may circumscribingly engage the inner layer 76 for initially securing the tubing relative to the cup.

A combination shield and guide element or bearing ferrule 84 comprising inner, outer and rounded lower walls 86, 88 and 90, respectively, is inserted upwardly over the lower edge of the tubing whereby inner wall 86 will overlappingly engage the outer face of innermost flap 92 of the tubing and wherein outer wall 88 will overlappingly engage the outer face of the lower portion of the outer layer 78 of the tubing.

Element 84 may be securely anchored relative to the tubing and cup by a suitable crimping operation. It will be noted that in this manner I have effectively sealed the lower end of the tubing 34 to the lower end of the cup, thereby providing a chamber 100 between adjacent faces of the cup and tubing. Those portions of the tubing adjacent side wall 24 of the cup comprise a flexible or distendable wall or sheath 102, it being noted that the introduction of fluid pressure into chamber 100 via conduit 54 will cause wall 102 to be forced away from rigid side wall 24 of the cup, thereby engaging an article inserted upwardly into the cup.

With particular reference now to Fig. 8, it will be noted that inner tubular flap 92 extends upwardly into the interior of the cup an appreciable distance in overlapping engagement with the inner wall 102 which inner wall it protects.

In the preferred embodiment of the invention the combination shield and guide element 84 is fabricated from metal such as, by way of example, stainless steel, or the like, characterized by its ability to withstand the corrosive action of fluids and further characterized by the provision of a smooth rigid bearing surface.

A plurality of rigid conduits 120 are secured to and carried by frame 10, it being understood that suitable means are provided for supplying pressure fluid through frame 10 to conduits 120. Note, by way of example, the Schmitzer, et al. U. S. Patent No. 2,308,209.

Flexible hose elements 14 are adapted to interconnect the rigid conduits 54 of each article engaging member with a corresponding rigid conduit 120 of frame 10 whereby each member will be loosely though securely supported from the frame in such a manner as to be independently and freely shiftable not only relative to the other members but relative to the frame. I have found that uniformly satisfactory results have been obtained when the length of flexible element 14 has been a dimension not less than the overall height of its associated article-engaging member.

With particular reference now to Figs. 3, 4 and 5, I have illustrated the manner in which the flexible suspension of the article engaging members enable such members to automatically compensate for axial misalignment of an article, such as bottle 16, the neck portion 118 of which is to be engaged by the member.

In Fig. 3 the letter X denotes the dimension by which the center line of neck 118 of bottle 16 is out of alignment from the axial center line of member 12, as said member is initially and freely suspended from frame 10.

In Fig. 4 it will be noted that as frame 10 has been lowered and the rounded bottom edge 90 of the combination shield and guide element 84 has engaged the upper end 122 of bottle neck 118 for tilting member 12 about flexible element 14, thereby enabling the member to slip onto the upper end of the bottle, as in Fig. 5. It will be noted that this automatic alignment of member 12 with the neck of the bottle is made possible by reason of the flexing of element 14. After the upper end of bottle neck 118 has been received within member 12, inner wall 102 may be expanded whereby to engage the upper end of the bottle neck thereby enabling the bottle to be lifted upwardly incident to elevation of frame 10.

This feature of loosely suspending the article-engaging members 12 is of prime importance since it greatly enhances the utility of the device by enabling the various article-engaging members to automatically align themselves with articles which are not in axial alignment with said members as they are initially loosely suspended from frame 10. Heretofore the industry has been put to considerable expense in providing complicated mechanisms for accurately disposing articles to be engaged in axial alignment with article-engaging members such as, by way of example, is disclosed in the C. Stecher U. S. Patent No. 2,119,725.

Another decided advantage of having the article-engaging members loosely suspended from a supporting frame 10 is that it will enable bottles or cans to be automatically removed from their original packing cases, the flexible suspension means enabling the articles to shift relative to one another by an amount sufficient to enable them to be withdrawn from their respective cases.

In those instances wherein article-engaging members have been used which are fixed relative to a supporting frame 10, considerable difficulty is experienced since the non-flexible mounting will not permit relative motion between the articles being lifted, with the result that the cases are invariably lifted with the articles.

Uniformly satisfactory results have been obtained in those instances wherein the flexible elements 14 frictionally engage conduits 54 and 120. When it is desired to replace a member all an operator need do is to grasp the flexible element of the particular member to be replaced and pull same off its conduit 120. Replacement is accomplished by merely introducing the free open end of a flexible member onto a conduit, it being understood, of course, that the normal frictional engagement of element 14 with conduits 54 and 120 is appreciably greater than the load placed thereon by an article suspended from the member. In this manner replacement of the article-engaging members may be accomplished without requiring the use of any tools whatsoever.

It should be understood that various changes and modifications may be made in the structural details of the device, within the scope of the appended claims, without departing from the spirit of the invention.

What is claimed is:

1. An article engaging member comprising a rigid cup-shaped member, a flexible tubular sheath of single thickness within said member means sealing the upper and lower ends of the sheath relative to said member to form a closed-ended annular chamber having a rigid outer wall and a flexible inner wall, a fluid conduit projecting from, secured to and carried by said member, and means connecting the interior of said chamber in open communication with said conduit.

2. A pressure-actuated article-engaging member comprising, in combination, a rigid cup-shaped housing, a flexible sheath within said member, said sheath comprising a length of single thickness flexible tubing, means for sealing the upper end of the tubing to the inner wall of the housing remote from its open end, the other end of said tubing folded upwardly over the lower edge of the housing, and means sealing the lower end of the tubing to the housing for providing a chamber between the tubing and housing, a fluid conduit projecting from, secured to and carried by said member, and means connecting the interior of said chamber in open communication with said conduit.

3. The pressure-actuated article-engaging member defined in and by claim 2, wherein the means for sealing the lower end of the tubing to the housing comprises an annular bearing ferrule which overlappingly engages the inner end and outer portions of the tubing where it is folded around the lower edge of the rigid housing.

4. A pressure-actuated article-engaging member comprising, in combination, a rigid cup-shaped housing, a flexible sheath within said member, said sheath comprising a length of flexible tubing, means for sealing the upper end of the tubing to the inner wall of the housing remote from its open end, the other end of said tubing folded upwardly over the lower edge of the housing and thence downwardly to provide a double thickness of tubing around the outer wall of the lower portion of the housing, thence inwardly and upwardly to provide a double thickness of tubing around the lower edge and interior of the housing, an annular U-shaped bearing ferrule securing the tubing in sealed relationship with the lower end of the housing for providing a chamber between the tubing and housing, a fluid conduit projecting from, secured to and carried by said member, and means connecting the chamber in open communication with said conduit.

5. The pressure-actuated article-engaging member defined in and by claim 4, wherein the ferrule comprises an outer, inner and rounded end wall, said inner and outer walls extending upwardly in spaced parallelism with the lower portion of said housing for defining a protective shield for the lower portions of the tubing.

6. The pressure-actuated article-engaging member defined in and by claim 4, wherein the free lower end of the tube projects upwardly from and beyond the upper edge of the inner ferrule wall defining a resilient, protective flap for the chamber defining portion of the tubing.

7. In article transferring apparatus, the combination of a movable frame, a plurality of rigid fluid conduits projecting from said frame, a source of fluid pressure, connections between said source and said conduits, a plurality of pressure-actuated article-engaging members each including a rigid fluid conduit projecting axially therefrom, a plurality of flexible hoses interconnecting the conduits of said members to the conduits of the frame, said hoses comprising the sole support by which said members are loosely suspended from the frame, each member including a flexible inner wall and means for controlling the supply of pressure fluid to said members for controlling movement of their respective inner walls to engage at least part of an article inserted therein, whereby said article may be transferred upon bodily movement of said frame.

8. In the article transferring apparatus defined in and by claim 7, wherein each flexible hose is securely though releasably fastened to a frame conduit solely by frictional engagement therewith.

9. In the article transferring apparatus defined in and by claim 7, wherein the length of each flexible hose is at least as great as the height of the article-engaging member suspended therefrom.

10. In the article transferring apparatus defined in and by claim 7, the provision of a combination shield and guide element on that end of each member remote from its fluid conduit.

11. In article transferring apparatus, the combination of a movable manifold frame, a plurality of hollow, cup-shaped, fluid pressure-actuated, article-engaging members each including an annular chamber defined by a substantially rigid outer wall and a flexible inner wall, flexible conduits interconnecting and comprising the sole means by which said members are individually and loosely suspended from said frame, said conduits connecting the interior of said chamber in open communication with the interior of said manifold frame, each member independently and freely shiftable relative to said frame to automatically compensate for axial misalignment with an article to be engaged thereby.

12. In article transferring apparatus the combination of a manifold frame, said manifold frame adapted to move substantially vertically downwardly into an article-engaging position, a plurality of article-engaging members, each of said article-engaging members including a rigid cylindrical wall portion normally disposed with the central axis thereof vertical, the lower end of said article-engaging member being open and terminating in a rim which is in a plane substantially at right angles to said central axis, a distensible annulus mounted within said article-engaging member above the rim thereof, said distensible annulus normally being disposed in close proximity to the inner surface of the cylindrical wall portion but being adapted to be expanded radially inwardly to engage the top of an article upon the application of fluid pressure thereto, and means for suspending each article-engaging member from the manifold frame, whereby, the cylindrical wall portion is adapted to shift freely from side to side, tilt, and to move upwardly upon engagement of the rim portion thereof with an article during movement of the frame vertically downwardly into article-engaging position, and the rim of the article-engaging member slips over the top of the article which is gripped by the expansion of the distensible annulus mounted above the rim.

13. In article transferring apparatus the combination of a manifold frame, said manifold frame adapted to move substantially vertically downwardly into an article-engaging position, a plurality of article-engaging members, each of said article-engaging members including a rigid, cylindrical wall portion normally disposed with the central axis thereof vertical, the lower end of said cylindrical wall portion being open and terminating in a rim which is in a plane substantially at right angles to said central axis, a distensible annulus mounted within said article-engaging member above the rim thereof, said distensible annulus normally being disposed in close proximity to the inner surface of the cylindrical wall portion but being adapted to be expanded radially inwardly upon the application of fluid pressure thereto, and a flexible hose for transmitting fluid pressure from the manifold to said distensible annulus, said flexible hose constituting the sole means for supporting and suspending said article-engaging member from the manifold frame, whereby said article-engaging member is adapted to shift freely from side to side, tilt, and to move upwardly upon the engagement of the rim portion thereof with an article during movement of the frame vertically downwardly into article-engaging position.

References Cited in the file of this patent

UNITED STATES PATENTS

| Number | Name | Date |
| --- | --- | --- |
| 1,222,535 | Crum | Apr. 10, 1917 |
| 1,519,243 | Ericson | Dec. 16, 1924 |
| 1,904,720 | Douglass | Apr. 18, 1933 |
| 1,943,483 | Miller | Jan. 16, 1934 |
| 1,987,336 | Powell | Jan. 8, 1935 |
| 2,308,209 | Schmutzer et al. | Jan. 12, 1943 |
| 2,390,242 | Engler | Dec. 4, 1945 |

FOREIGN PATENTS

| Number | Country | Date |
| --- | --- | --- |
| 688,211 | France | Aug. 20, 1930 |